US012767186B2

(12) United States Patent
Sternberg et al.

(10) Patent No.: US 12,767,186 B2
(45) Date of Patent: Oct. 20, 2026

(54) METHOD FOR OPERATING A VEHICLE

(71) Applicant: Daimler Truck AG, Leinfelden-Echterdingen (DE)

(72) Inventors: Alexander Sternberg, Stuttgart (DE); Thomas Wagner, Stuttgart (DE); Enrico Wohlfarth, Winnenden (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 239 days.

(21) Appl. No.: 17/763,099

(22) PCT Filed: Aug. 20, 2020

(86) PCT No.: PCT/EP2020/073364
§ 371 (c)(1),
(2) Date: Mar. 23, 2022

(87) PCT Pub. No.: WO2021/058205
PCT Pub. Date: Apr. 1, 2021

(65) Prior Publication Data

US 2022/0388544 A1 Dec. 8, 2022

(30) Foreign Application Priority Data

Sep. 24, 2019 (DE) ..................... 10 2019 006 685.5

(51) Int. Cl.
*B60W 60/00* (2020.01)
*B60W 50/00* (2006.01)
*B60W 50/14* (2020.01)

(52) U.S. Cl.
CPC .... *B60W 60/0053* (2020.02); *B60W 50/0097* (2013.01); *B60W 50/14* (2013.01);
(Continued)

(58) Field of Classification Search
CPC ............ B60W 50/0097; B60W 50/14; B60W 2556/10; B60W 60/0054
See application file for complete search history.

(56) References Cited

U.S. PATENT DOCUMENTS

2004/0019425 A1* 1/2004 Zorka .................... G08G 1/163 340/436
2017/0197618 A1* 7/2017 Ali .................... B60W 60/0016
(Continued)

FOREIGN PATENT DOCUMENTS

CN 103085818 A 5/2013
CN 104290745 A 1/2015
(Continued)

OTHER PUBLICATIONS

English-language Chinese Office Action issued in Chinese Application No. 202080066766.3 dated Jul. 13, 2023 (3 pages).
(Continued)

*Primary Examiner* — Toya Pettiegrew
(74) *Attorney, Agent, or Firm* — Crowell & Moring LLP

(57) ABSTRACT

A method for operating a vehicle in an automatic driving operation not requiring any user action which can be deactivated by a deactivation action of a driver of the vehicle includes, during the automatic driving operation in a learning phase, driving situations in which the driver deactivates the automatic driving operation are recorded by a surroundings recording device and the recorded driving situations are stored in a memory as subjectively critical driving situations. The method further includes, during an operating phase of the automatic driving operation, comparing a currently recorded driving situation to the stored subjectively critical driving situations and emitting a warning to the driver when the currently recorded driving situation
(Continued)

matches one of the stored subjectively critical driving situations within a tolerance range.

11 Claims, 2 Drawing Sheets

(52) U.S. Cl.
CPC . *B60W 2420/403* (2013.01); *B60W 2420/408* (2024.01); *B60W 2420/54* (2013.01); *B60W 2540/215* (2020.02); *B60W 2552/10* (2020.02); *B60W 2554/4045* (2020.02); *B60W 2554/802* (2020.02); *B60W 2556/45* (2020.02)

(56) References Cited

U.S. PATENT DOCUMENTS

| | | | | |
|---|---|---|---|---|
| 2018/0059661 | A1* | 3/2018 | Sato | B60W 40/04 |
| 2019/0344804 | A1* | 11/2019 | Motomura | B60W 40/10 |
| 2020/0249684 | A1* | 8/2020 | Onofrio | G05D 1/65 |
| 2020/0319635 | A1* | 10/2020 | Andres | G05D 1/0212 |
| 2020/0409362 | A1* | 12/2020 | Long | B60W 50/14 |
| 2021/0024087 | A1* | 1/2021 | Kim | B60W 40/09 |
| 2021/0370983 | A1* | 12/2021 | Oba | G08G 1/166 |
| 2021/0387614 | A1* | 12/2021 | Tashiro | B60W 50/0098 |
| 2022/0319327 | A1* | 10/2022 | Nakamura | G08G 1/096791 |
| 2022/0348217 | A1* | 11/2022 | Jeong | B60W 50/14 |

FOREIGN PATENT DOCUMENTS

| | | | |
|---|---|---|---|
| DE | 10 2012 111 846 | A1 | 6/2013 |
| DE | 10 2012 112 802 | A1 | 6/2014 |
| DE | 10 2016 215 528 | B4 | 2/2018 |
| DE | 10 2016 224 291 | A1 | 6/2018 |
| EP | 3 428 030 | A1 | 1/2019 |

OTHER PUBLICATIONS

PCT/EP2020/073364, International Search Report dated Dec. 18, 2020 (Two (2) pages).

* cited by examiner

METHOD FOR OPERATING A VEHICLE

BACKGROUND AND SUMMARY OF THE INVENTION

The invention relates to a method for operating a vehicle.

Such a method is known from DE 10 2012 112 802 A1. In this printed publication, a device for controlling a vehicle is described, which comprises a driver assistance system, which enables autonomous, partially autonomous and manual driving. Furthermore, the device comprises a surroundings recording unit and an analysis unit for evaluating the surroundings situation of the vehicle by analysing the surroundings data generated by the surroundings recording unit. The device further comprises a hazard warning device that can be controlled by the driver assistance system during autonomous or partially autonomous driving, i.e., during an automatic driving operation and that is provided to emit a warning signal as a takeover request to the driver depending on the evaluation of the surroundings situation of the vehicle. In the known method, a takeover probability is determined by means of a risk predicting unit based on the surroundings data and based on driving dynamic data of the vehicle during autonomous and partially autonomous driving, which takeover probability will probably soon require driver intervention. Furthermore, an attention level of the driver is predicted by means of an attention prediction unit, and finally a duration of time until generating the warning signal is determined from the takeover probability depending on the attention level of the driver.

The object of the invention is to specify an improved method for operating a vehicle in an automatic driving operation.

In a method according to the invention for operating a vehicle in an automatic driving operation not requiring any user action, the automatic driving operation is deactivated by a deactivation action of a driver of the vehicle, in particular by a driver engaging in steering and/or accelerating functions of the vehicle. In the automatic driving operation, a driving situation in the surroundings of the vehicle is recorded by means of at least one surroundings recording device, and in the event of a critical driving situation, a warning is emitted to the driver. According to invention, driving situations are recorded during automatic driving operation in at least one learning phase, in which the driver has deactivated the automatic driving operation. These recorded driving situations are stored in a memory as subjectively critical situations. In a regular operating phase of the automatic operation, it is then compared as to how far a currently recorded driving situation matches one of the stored subjectively critical driving situations, and when it matches sufficiently, i.e., when it matches within a predetermined tolerance range, the warning is emitted to the driver.

The method according to the invention makes it possible to learn driving situations which the driver perceives as subjectively critical. These are situations in which the driver has the feeling of having to take control of the vehicle, although it would technically be possible to safely continue the automatic driving operation. The detection of such subjectively critical situations is carried out by the at least one surroundings recording device. For this, in the learning phase of the automatic driving operation, the respectively present driving situation is continuously recorded, and all the driving situations in which the driver ends the automatic driving operation without being prompted, i.e., without a preceding warning, and with that takes over driving the vehicle, are stored as subjectively critical situations. After the learning phase, the driver is always warned in the future when the respectively currently recorded driving situation matches one of the stored subjectively critical situations or is similar to them. If the driver is distracted during the automatic driving operation, a warning prepares them for a driving situation occurring which, at an earlier point in time, they perceived as a subjectively critical situation. Thus, they are not surprised by a suddenly occurring, subjectively critical situation.

In an embodiment of the method according to the invention, the subjectively critical situations are stored in the vehicle or on a remote server.

In an embodiment, the subjectively critical situations are stored specifically to the driver. Thus, the warning output is adjusted to the respective driver. The identification of the driver can be carried out conventionally, for example via the vehicle key, via a driver card that is usual with commercial vehicles or via a manual input in an operating system.

Alternatively or additionally, the subjectively critical situations are stored specifically to the location, in particular specifically to the route. Thus, the warning output is adjusted to the respective operating location of the vehicle. This is advantageous because the behaviour of road users in the surroundings of the vehicle can be regionally different and thus because the requirement of the driver to take over driving the vehicle in certain situations can also be regionally different. The localisation of the vehicle can here be carried out with a conventional localisation system, in any case necessary for the automatic driving operation.

In an embodiment, when recording the driving situation, a driving track and objects, in particular further vehicles, in the surroundings of the vehicle, are recorded when recording the driving situation.

In an embodiment, the at least one surroundings recording device comprises one or more cameras, one or more radar sensors, one of more Lidar sensors and/or one or more ultrasound sensors.

In an embodiment, sensor data recorded by means of the at least one surroundings recording device are divided into interest regions, wherein one of the interest regions is an ego lane where the vehicle is moving, wherein at least another of the interest regions is a left and/or right lane adjacent to the ego lane, wherein motion data of all objects perceived in these interest regions are calculated, wherein the most critical object or the critical objects is or are identified which moves or move into a safety corridor inside the ego lane.

In an embodiment, at least one of the following variables is calculated for at least one or each of the objects by means of the at least one surroundings recording device:

- a time which is necessary for the object to reach the safety corridor of the vehicle when trajectories of the vehicle and the object intersect,
- a time which is necessary for the vehicle to cover a longitudinal distance to the object,
- a time which is necessary for the vehicle to reach a point at which the object reaches the safety corridor of the vehicle, less the time necessary for the object to reach this point.
- a longitudinal distance between the vehicle and the object when the limit of the safety corridor is exceeded.

In an embodiment, the object with the lowest time necessary for the object to reach the safety corridor of the vehicle when trajectories of the vehicle and the object intersect is identified as the most critical object. Alternatively and/or additionally, other variables can be used for this purpose.

In an embodiment, as soon as a critical object or the most critical object is identified, a piece of fuzzy logic is used in order to predict whether the driver perceives a higher or lower subjective complexity.

In an embodiment, the comparability of stored critical driving situations with the current driving situation is determined by means of a majority election mechanism and/or, based on the prediction and the comparison of the stored driving situation with the current driving situation, a trust percentage is calculated, wherein an adaptive benchmark that can be set by the driver is determined as to whether the trust percentage is high enough to warn the driver of a critical situation.

The proposed method ensures that a driver is informed in good time about driving situations which are unpleasant for them. When the vehicle possesses the control of the vehicle, i.e., is in the automatic driving operation, the driver can get the feeling that the vehicle cannot tackle an oncoming driving situation. Using the method, preferences based on the person are learnt as to when a driver wants to assume control of the vehicle, and such situations are ascertained predictively on the basis of previous situations.

The invention further relates to a vehicle, comprising a driver assistance system for an automatic driving operation not requiring any user interaction, wherein the automatic driving operation can be deactivated by a deactivation action of a driver of the vehicle, in particular by a driver engaging in steering and/or acceleration functions of the vehicle, wherein at least one surroundings recording device is provided in order to record a driving situation in the surroundings of the vehicle, wherein at least one control unit is provided which is formed to carry out the method described above.

Exemplary embodiments of the invention are explained in more detail below by means of the drawings.

DETAILED DESCRIPTION OF THE DRAWINGS

Figure 1:
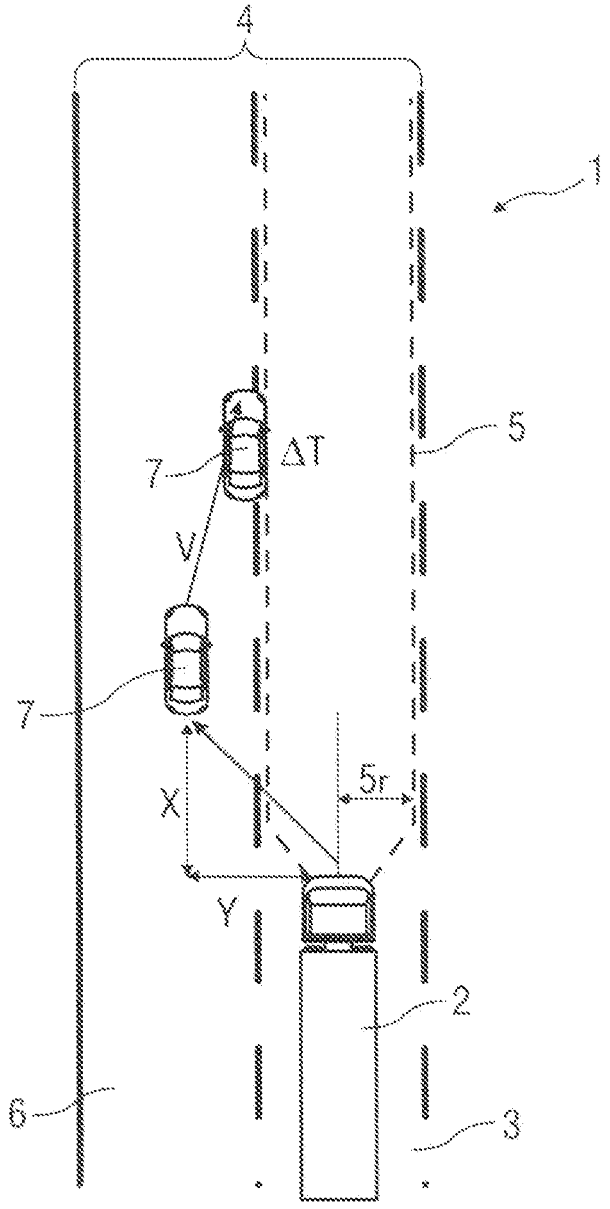
FIG. 1 is a schematic view of a driving situation.

Parts corresponding to one another are provided with the same reference numerals in all figures.

FIG. 1 shows a schematic view of a driving situation 1 with a vehicle 2, which is driving in an ego lane 3 of a driving track 4. In front of the vehicle 2 in the driving direction, a safety corridor 5 is defined, which the vehicle 2 will presumably travel along. The safety corridor 5 has a width which is greater than the width of the vehicle 2. The width of the safety corridor 5 can vary with the distance to the vehicle. An object 7, for example a further vehicle, is in transit on a lane 6 adjacent to the ego lane 3, with a longitudinal distance X and a transverse distance Y to a front edge, in the driving direction, of the vehicle 2. The object 7 moves with a speed V in the longitudinal direction and the transverse direction in the ego lane 3, such that it enters the safety corridor 5 after a time ΔT. The vehicle 2 has sensors for recognising the driving situation 1, in particular the driving track 4 and objects 7. Such sensors can comprise one or more cameras, radar sensors, Lidar sensors and/or ultrasound sensors etc.

Figure 2:
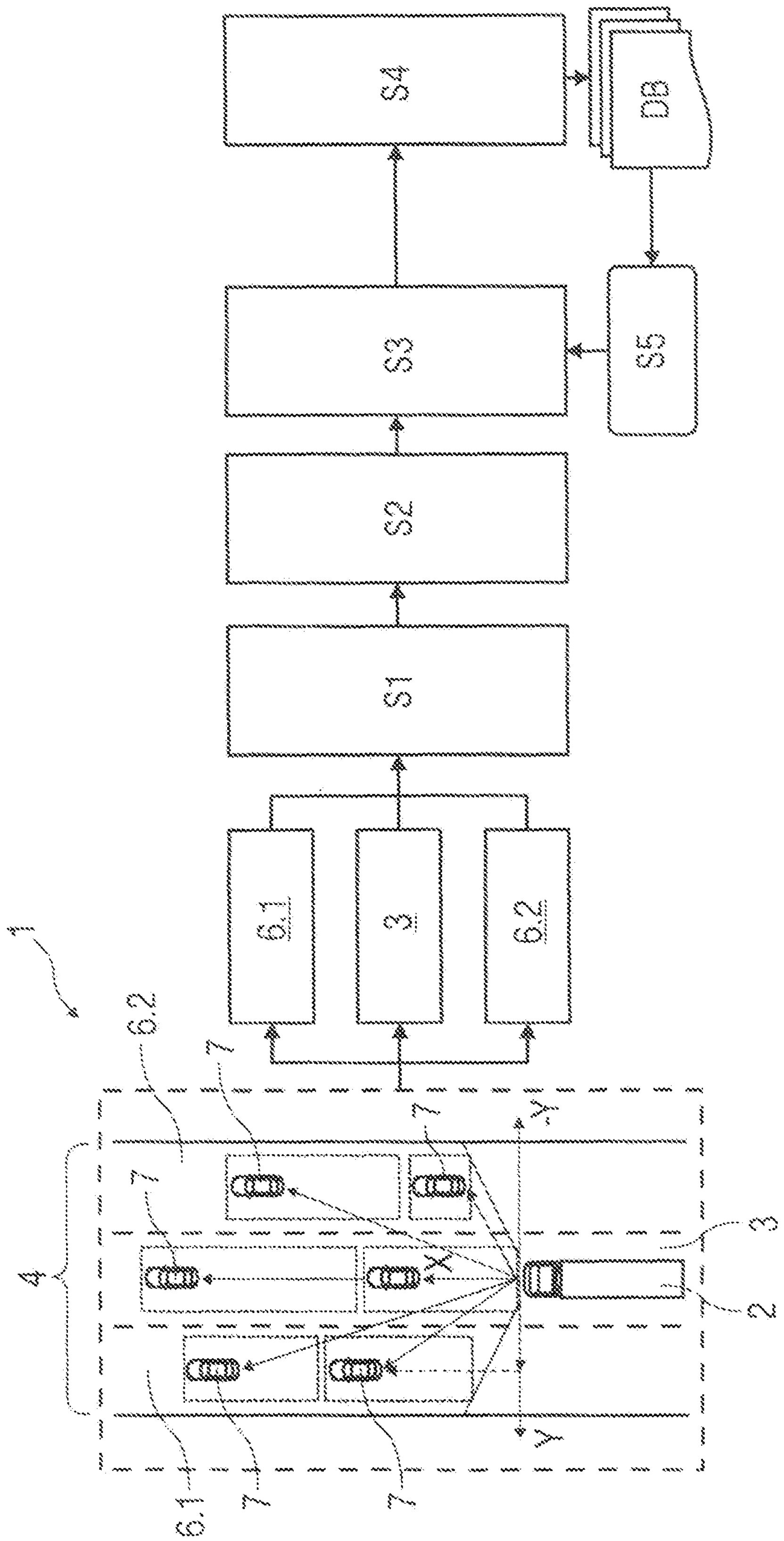
FIG. 2 is a schematic view of a driving situation and a workflow for ascertaining a criticality of the driving situation.

FIG. 2 shows a schematic view of a driving situation 1 with a vehicle 2, which drives along an ego lane 3 of a driving track 4. Furthermore, a workflow is depicted for determining a criticality of the driving situation 1.

The criticality of the driving situation 1 can be ascertained by means of a subjective complexity model.

The proposed model is based on the vehicle 2 having a driver assistance system which is able to simultaneously take over longitudinal and transverse control of the vehicle 2 without the driver having to have their hands on the steering wheel. Typically, this is only possible with advanced level 2 or level 3 systems, since the driver has complete or partial longitudinal and transverse control in lower automatic levels. The aim of the model is to make predictions as to when the complexity of the driving situation 1 reaches a point in the surroundings where the driver has the impression that their intervention is required. When the driver intervenes, the driver subjectively decides that, from their point of view, the complexity of the driving situation 1 is too high to trust the driver assistance system to handle the driving situation. In this case, the driver assistance system stores the sensor data of this driving situation 1 or data characterising the driving situation in a database DB. Here, the database DB can be located in the vehicle 2 or on an external server, to which a communication connection is established via radio.

FIG. 2 shows a workflow for ascertaining a criticality of the driving situation 1 by means of the driver assistance system. Sensor data are divided into the interest regions of left lane 6.1, ego lane 3 and right lane 6.2. Movement data of all perceived objects 7 into these interest regions are calculated, whereupon the critical objects are identified, for example the object 7 shown in FIG. 1, which moves into the safety corridor 5. The criticality is calculated based on previously stored data.

Sensor data relating to the objects 7 in the surroundings are received and divided into the three possible interest regions, left lane 6.1, ego lane 3 and right lane 6.2. The received raw data includes transverse and longitudinal positions and speeds V of the object 7 in relation to the vehicle 2. This makes it possible to easily calculate the relative speed V between each of the objects 7 and the vehicle 2.

In an exemplary embodiment of the proposed of the driver assistance system, six objects 7 can be perceived, a maximum of two per interest region 3, 6.1, 6.2. In other embodiments, higher numbers of objects 7 can be perceived and their positions and speeds V analysed.

Based on sensor data, for example radar data, the following cinematic variables are calculated in a step S1:

$$TT_{cross\_border} = \left( \frac{Dist_y - \left( \frac{1}{2}(Width_y) + \text{Buffer} \right)}{Spd_y} \right) \quad (1)$$

$$TT_{headway} = \frac{Dist_x}{RelSpd} \quad (2)$$

$$TTC_{cross\_border} = TT_{headway} - TT_{cross\_border} \quad (3)$$

$$Dist_{cross\_border} = TT_{cross\_border} * RelSpd \quad (4)$$

Overall, ten cinematic variables, for example, are taken into consideration with the available sensors, for example the following variables:

| Variable name | Definition |
| --- | --- |
| $Dist_x$ | Longitudinal distance X of the front edge of the vehicle 2 |

-continued

| Variable name | Definition |
|---|---|
| | to the rear end of the object 7 |
| $Dist_y$ | Transverse distance Y of the front edge of the vehicle 2 to the rear end of the object 7 |
| $Spd_x$ | Longitudinal speed of the object 7 in relation to the longitudinal axis of the vehicle 2 |
| $Spd_y$ | Transverse speed of the object 7 in relation to the transverse axis of the vehicle 2 |
| $EgoSpd_x$ | Speed V of the vehicle 2 along its longitudinal axis |
| RelSpd | Difference of the longitudinal speed between the object 7 and the vehicle 2 |
| $TT_{cross\_border}$ | The time ΔT necessary for the object 7 to reach the safety corridor 5 of the vehicle 2. Only taken into consideration when the trajectories of the vehicle 2 and the object 7 intersect. |
| $TT_{headway}$ | The time ΔT necessary for the vehicle 2 to cover the longitudinal distance X $Dist_x$ to the object 7 |
| $TTC_{cross\_border}$ | The time ΔT necessary for the vehicle 2 to reach a point at which the object 7 reaches the safety corridor 5 of the vehicle 2, less the time necessary for the object 7 to reach this point. This measure takes into consideration the time until the collision when the limit of the safety corridor 5 is exceeded. |
| $Dist_{cross\_border}$ | The longitudinal distance X between the vehicle 2 and the object 7 when the limit of the safety corridor 5 is exceeded. |

Each relevant object 7 in the three lanes 3, 6.1, 6.2 has a separate set of these variables. Further variables can include angle of intersection and the time ΔT at which the object 7 will leave the safety corridor 5.

After calculating the cinematic variables, the critical object 7 is identified in a step S2, for example the object 7 shown in FIG. 1. For example, the minimum time ΔT $TTC_{cross\_border}$ of all recognised objects 7 is used as the comparison measure for the objective complexity (see equation (3)). More than one critical object 7 can also be taken into consideration.

As soon as a critical object 7 or the critical object 7 is identified, the driver assistance system uses a piece of fuzzy logic in order to predict whether the driver perceives a high or a low degree of subjective complexity. All cinematic variables can be used for the prediction method. A majority election mechanism determines the comparability of stored driving situations with the current driving situation 1. Based on the prediction and the comparison of the stored driving situations with the current driving situation 1, a trust percentage is calculated in a step S5. An adaptive benchmark which can be adjusted by the driver determines whether the trust percentage is high enough to warn the driver of a critical driving situation in a step S3. The adaptive benchmark determines whether the driver assistance system is sensitive or idle with its warning. Every time the driver takes back the control of the vehicle 2 during the learning phase, the current driving situation 1 is recorded and stored in a database DB in a step S4. The stored data comprise the current constellation, that is to say both the cinematic variables of the objects 7 in the surroundings and the constellation of the vehicle 2 shortly before. The moment that is considered to be shortly before depends on the reaction times of the driver. Since the driving surroundings can change dramatically due to the type of driving track 4 and national limitations, the data and types of driving culture can be formed to be completely adaptative in the surroundings. The preferences of the driver can also vary over time ΔT in terms of the warning and can be compared to other drivers. By more and more data being recorded, the database DB adapts over time ΔT, such that it can be personalised to each driver.

The particular advantage of the present exemplary embodiment is that driving situations are identified which the driver subjectively perceives as critical and which they do not trust the driver assistance system to handle. Here, such driving situations are identified as subjectively critical in which the driver ends the automatic driving operation by taking over driving of the vehicle. The identified driving situations are stored for later use. In the future automatic driving operation, the driving situations currently recorded in each case are compared to the stored situations and, when a sufficient agreement is established, the driver is informed about this by a warning being emitted. The driver is thus warned of the emergence of a driving situation which, from their point of view, is critical. Thus, the warning threshold is adjusted to the needs of the driver.

The invention claimed is:

1. A method for operating a driver assistance system, wherein the driver assistance system is configured to: autonomously drive the vehicle via an automated driving operation during which the driver assistance system emits a warning to a driver to deactivate the automated driving operation in response to on-the-vehicle-sensor-detected driving situations that are within respective tolerance ranges of respective critical driving situations stored in a memory, the method comprising:

operating the driver assistance system in a learning phase in which the vehicle is controlled via the automated driving operation and the driver assistance system:
- detects (a) that a driver of the vehicle has deactivated the automated driving operation via engaging the steering and/or acceleration functions in the absence of the warning and where no on-the-vehicle-sensor-detected driving situation is detected as within the tolerance range of any critical driving situation currently stored in the memory, and (b) a first on-the-vehicle-sensor-detected driving situation contemporaneous to and causing the deactivation of the automated driving operation by the driver, via one or more sensors of the driver assistance system, and
- stores the first on-the-vehicle-sensor-detected driving situation so as to be referable to by the driver assistance system as a critical driving situation with respect to which the warning is emitted when the on-the-vehicle-sensor-detected driving situations are within the tolerance range thereof.

2. The method according to claim 1, wherein the critical driving situation is stored in the vehicle or on a remote server.

3. The method according to claim 1, wherein the critical driving situation is stored specific to the driver and/or specific to a location.

4. The method according to claim 1, wherein, when recording the first driving situation, a driving track and objects in the surroundings of the vehicle are recorded.

5. The method according to claim 1, wherein the one or more sensors include at least one of: a camera, a radar sensor, a Lidar sensor, and an ultrasound sensor.

6. The method according to claim 1, wherein sensor data of the one or more sensors is divided into interest regions, wherein a first interest region is an ego lane in which the vehicle moves, and a second interest region is a left lane and/or a right lane adjacent to the ego lane, wherein movement data of objects in the interest regions is calculated, and wherein a critical object is identified which moves into a safety corridor inside the ego lane.

7. The method according to claim 6, wherein, based on the sensor data, at least one of the following variables is calculated for the objects:

a) a time which is necessary for the object to reach the safety corridor when trajectories of the vehicle and the object intersect;

b) a time which is necessary for the vehicle to cover a longitudinal distance to the object;

c) a time which is necessary for the vehicle to reach a point at which the object reaches the safety corridor less a time necessary for the object to reach the point; and d) a longitudinal distance between the vehicle and the object when a limit of the safety corridor is exceeded.

8. The method according to claim 7, wherein a most critical object is identified as the object with the lowest time a) or c).

9. The method according to claim 8, wherein, as soon as the critical object or the most critical object is identified, a piece of fuzzy logic is used to predict whether the driver conceives a higher or lower degree of complexity.

10. The method according to claim 1, wherein the determination that the second driving situation is within a tolerance range of the first driving situation is performed by a majority election mechanism.

11. The method according to claim 9, wherein, based on the prediction and the determination, a trust percentage is calculated, wherein an adaptive benchmark that is adjustable by the driver determines whether the trust percentage is high enough to warn the driver of the critical driving situation.

* * * * *